(No Model.)
J. TIPTON.
POST HOLE DIGGER.
No. 493,536. Patented Mar. 14, 1893.
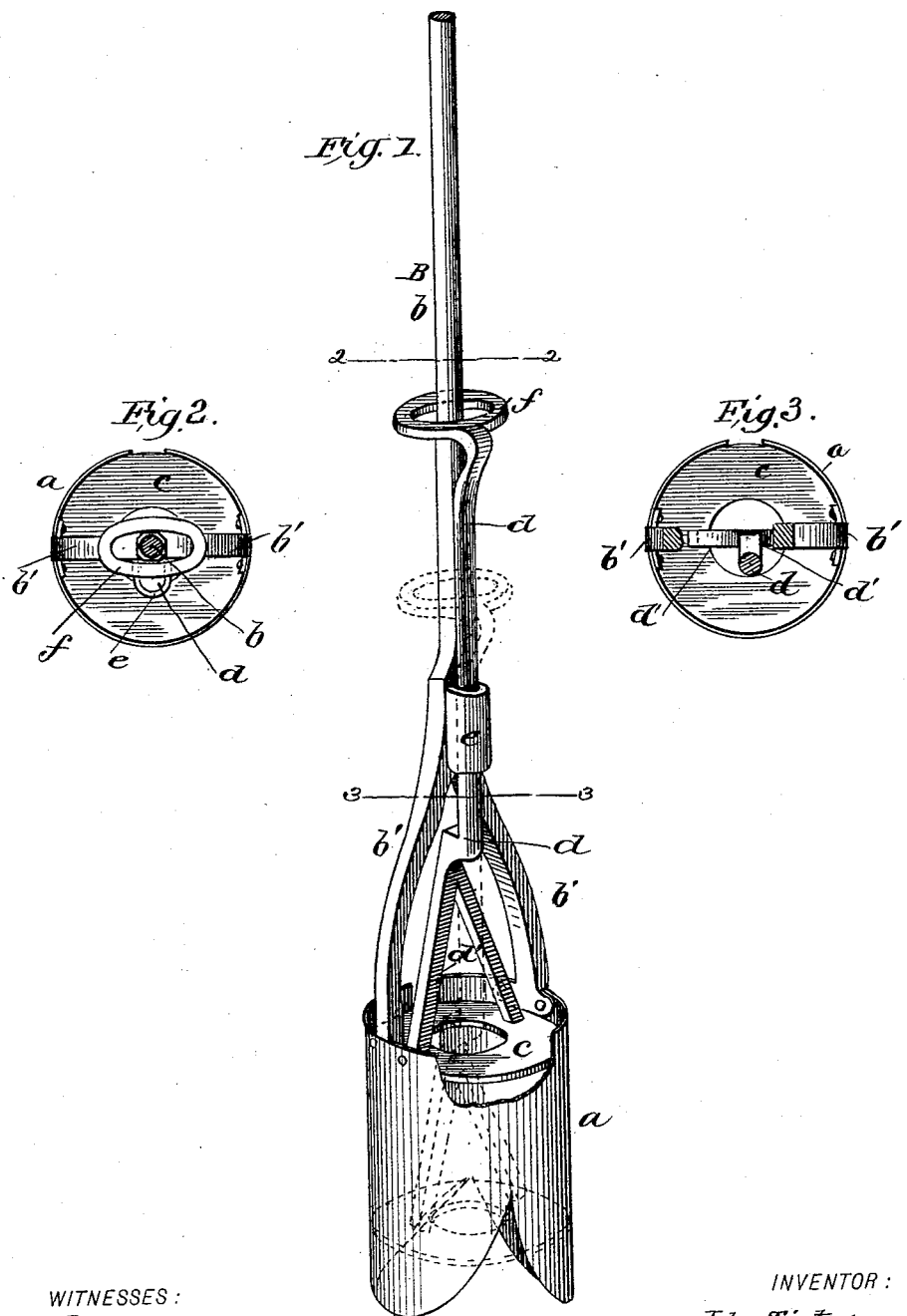
WITNESSES:
H. J. Robinson.
Amos W. Hart
INVENTOR:
John Tipton.
BY Munn & Co.
ATTORNEYS

UNITED STATES PATENT OFFICE.

JOHN TIPTON, OF HYMERA, INDIANA.

POST-HOLE DIGGER.

SPECIFICATION forming part of Letters Patent No. 493,536, dated March 14, 1893.

Application filed July 21, 1892. Serial No. 440,778. (No model.)

*To all whom it may concern:*

Be it known that I, JOHN TIPTON, of Hymera, in the county of Sullivan and State of Indiana, have invented an Improved Post-Hole Digger, of which the following is a specification.

My invention is an improvement in that class of post-hole diggers whose bodies consist of a sheet iron or steel cylinder having its lower edge notched and beveled to form cutters, and within which is arranged a sliding or adjustable device for expelling the soil taken up by the cylinder in the process of digging.

The features constituting my improvement will be hereinafter described in connection with others forming the complete digger.

In the accompanying drawings, Figure 1, is a perspective view of my complete device. Fig. 2, is a top plan partly in section taken on line 2—2 of Fig. 1. Fig. 3, is a top plan, partly in section, taken on line 3—3 of Fig. 1.

The cylindrical body $a$, of the digger is formed of a single sheet of iron or steel and provided with a lengthwise slot in one side, and riveted to the bifurcated handle $b$. The lower end of the cylinder $a$, is deeply notched on opposite sides, thus forming what I term "shovel" points whose edges are beveled to adapt them to serve as cutters. Within the cylinder $a$, is arranged transversely an adjustable or sliding disk $c$, having a central opening. This disk is rigidly attached to a bifurcated rod $d$ which works in a keeper $e$ on the digger handle $b$. This device is used as a dirt tamper and expeller. That is to say, if the soil is dry, the disk $c$ may be used to tamp it and thus cause it to pack in the cylinder $a$ sufficiently to be retained while the cylinder is being removed from the excavation. When the cylinder has been thus withdrawn, the device $c$ will expel the soil when pushed downward with the required force. This operation is effected by the operator applying his foot to the ring $f$, which is formed on or rigidly attached to the upper end of the push-rod $d$, to which the disk $c$ is secured. The said ring $f$, surrounds the handle $b$, of the digger proper, and thus not only serves as a pedal piece but also as a supplementary keeper and guide for the push-rod $d$. It will be noted also that the ring $f$ is elongated, or elliptical-shaped, and thus projects on opposite sides of the handle $b$, parallel with the fork $b'$. This construction provides extensions upon which the foot may be conveniently supported at either side of the digger handle, to force the disk $c$ downward for expelling the contents of the cylinder, and serve as handles which may be conveniently seized by the operator, for reciprocating the disk in the tamping operation, yet the ring $f$, works close to the digger handle on two sides, so that its function of a guide is preserved.

It is important that the fork $d'$, of the disk, $c$, should be attached at the middle of the latter, and hence it is arranged within and parallel with the fork, $b'$, of the digger handle as shown. The upper portion of the disk handle, $d$, therefore forms an offset with the fork, $d'$, so that they are in different but parallel planes.

What I claim is—

In a post-hole digger, the combination, with the cylinder, its bifurcated handle, and the annular dirt-tamper $c$, of the push-rod, $d$, attached to said dirt-tamper and having an offset and a bifurcation which is aligned with the bifurcation of the cylinder handle, and the flat ring $f$, formed on its upper end, and embracing the cylinder handle and having opposite lateral extensions, as shown and described.

JOHN TIPTON.

Witnesses:
F. M. NEAD,
C. C. NICHOLSON.